Nov. 21, 1950
M. C. FUQUA
2,530,953
SULFURIC ACID RECOVERY
Filed Nov. 1, 1946
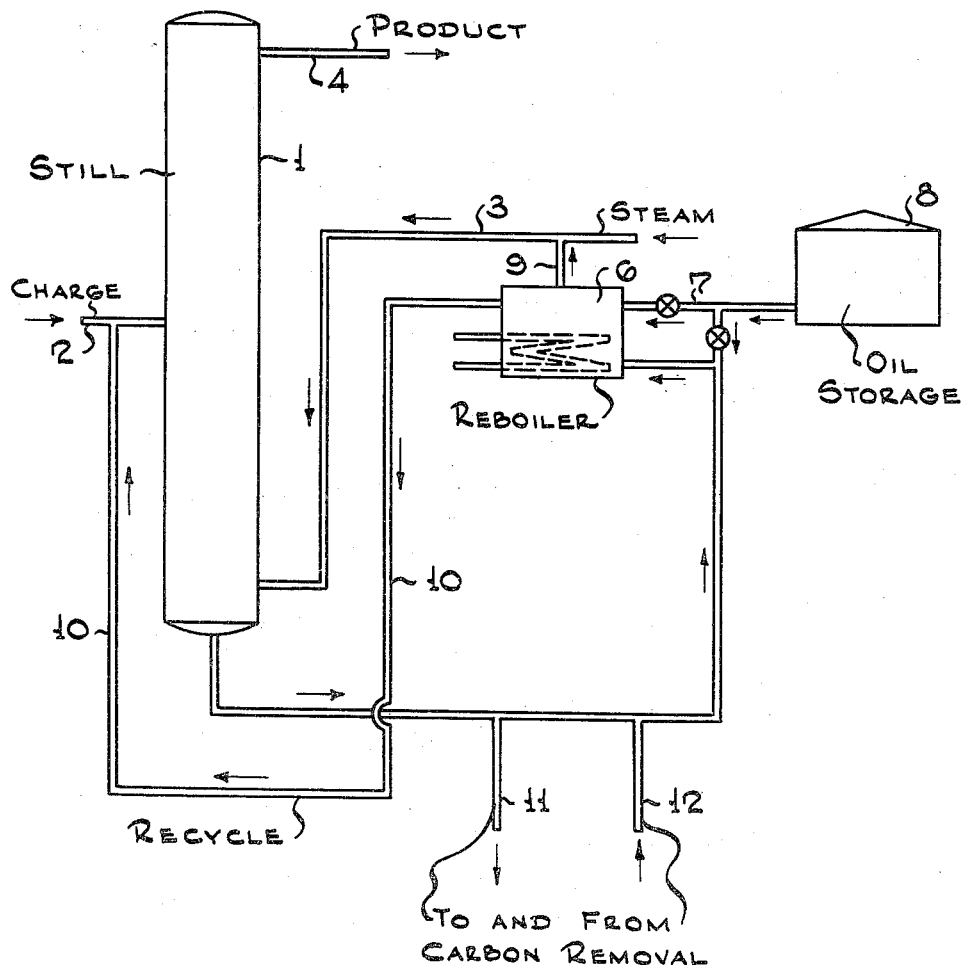
Mack C. Fuqua Inventor
By J. K. Small Attorney

UNITED STATES PATENT OFFICE 2,530,953

SULFURIC ACID RECOVERY

Mack C. Fuqua, Baton Rouge, La., assignor to Standard Oil Development Company, a corporation of Delaware Application November 1, 1946, Serial No. 707,221

3 Claims. (Cl. 23—173)

This invention relates to an improved process for the reconcentration of spent acid from a manufacturing process wherein acid becomes diluted and more particularly relates to the prevention of foaming of a spent acid in the acid reconcentration step.

In the manufacture of alcohols from unsaturated hydrocarbons by the use of strong sulfuric acid, recovery of the acid is a most important step. In the process, product alcohol is obtained by stripping from an acid-hydrocarbon extract leaving a weak acid residue. The weak acid is then reconcentrated in a reboiler wherein heat is supplied either directly or by heat exchange with the heated products of a stripping still or some other unit of the process. In the reboiler the acid may be partially reconcentrated and brought up to full strength in a subsequent operation or fully concentrated in the reboiler.

Great difficulties have been experienced in the concentration step because of foaming of the weak acid. Foaming greatly limits the throughput of acid in the reboilers, thereby limiting the efficiency of the operation. Several other harmful results follow. A part of the heating tubes become covered with foam instead of the acid to be concentrated thereby insulating them. As a result the rate of heat transfer is greatly reduced and breakage of the tubes due to thermal shock occurs.

It is therefore the main object of this invention to provide an efficient process for the suppression of foam in an acid reconcentrator or reboiler.

The object of the invention is accomplished by adding a quantity of oil that represents a very small fraction of the acid to be concentrated. The said oil must be acid resistant and must have a high enough flash point to prevent complete flashing in the reboiler. Any suitable hydrocarbon oil may be used, such as an oil of approximately 28° gravity API.

Satisfactory foam suppression may also be obtained by adding to the reboiler a small quantity of the said acid resistant oil mixed with a small quantity of a high molecular weight organic acid, such as stearic, palmitic, oleic, etc.

Various methods may be employed in adding the oil to the acid to be reconcentrated, such as adding it to the acid feed to the reboiler, adding it directly to the reboiler or by intermittent injection into either the acid feed or directly into the reboiler. It has been found most satisfactory to inject a small quantity of oil at intervals of several hours directly into the reboiler. This intermittent introduction of oil has been found sufficient to prevent foaming and to maintain proper temperatures and acid levels in the reboiler.

The drawing is a schematic view in elevation of the application of the invention to the suppression of foaming in an acid recovery step in the manufacture of ethyl alcohol.

Referring now to the drawing a sulfuric acid extract containing partially hydrolyzed alkyl sulfates obtained by absorbing olefins from a hydrocarbon fraction in 65–100% sulfuric acid and subsequently diluting with water to an acid strength of 45% calculated on a hydrocarbon and alcohol free basis is introduced into stripping still through line 2. This still may be either a packed column or a plate column. The acid extract flows down through the column countercurrent to a stripping medium introduced at the bottom of the still through line 3. In this manner product alcohol is stripped from the weak acid extract and removed from the top of still 1 through line 4.

The weak acid is removed from still 1 by line 5 and introduced into reboiler 6, a portion of which may be drawn off for carbon removal by line 11 and returned by line 12. A suitable hydrocarbon oil is contacted with the acid either by introduction into line 5 prior to entry into reboiler 6 or by introduction of said oil in an upper portion of the reboiler by line 7. The oil may be forced into contact with the acid stream or acid reboiler by inert gas pressure or other means from oil storage drum 8. Foaming is prevented in the reboiler by the addition of the oil. Steam and volatile hydrocarbons are removed by line 9 and concentrated acid is removed from the reboiler by line 10 and directed to a recycle stage.

*Example*

A sample of generator bottoms containing 45% acid was charged to a laboratory concentration flask and heated to boiling. Foaming began promptly. At this juncture 2 ml. of white oil containing 4% stearic acid by volume was added. The foaming stopped and the acid did not foam again until the temperature had reached 157° C. A small amount of suitable oil and acid were again added and the concentration was continued to 165° C. before foaming began again.

The composition and nature of white oil is so generally known that no specific description of this oil will be given herein. Reference may be made to "The Chemical Technology of Petroleum" by Gruse and Stevens, published by the McGraw-Hill Publishing Company, pages 629 to 631.

The same experiment was repeated using a suitable oil without stearic acid. The same results were obtained.

The amount of oil necessary to prevent foaming in an acid concentration depends upon the severity of the foaming, but in general, an amount of oil large enough to form a film over the surface of the acid is adequate. Specific amounts of oil would probably range from 0.001 to 1.0 percent by weight based on 100% $H_2SO_4$ being concentrated. The amount would be expected to be the same whether added periodically or continuously. One-half gallon of oil may be added every four hours to the reboilers in the process described. This amount represents 0.004% oil based on the acid concentrated during this period.

From the above description it is clear that a process has been discovered whereby the detrimental effects of foaming in an acid reconcentration step has been overcome by adding a suitable hydrocarbon oil to the reboiler.

While the process has been described in connection with acid reconcentration in an alcohol manufacturing process, the foam inhibiting is equally adaptable to any process where acid reconcentration is essential. The invention is not intended to be limited therefore to reconcentration in any particular process.

The nature and objects of the present invention having thus been set forth and specific examples of the same given, what is claimed as new and useful is:

1. A process for the reconcentration of a spent sulfuric acid resulting from acid treatment of hydrocarbons which comprises heating the said spent sulfuric acid in the presence of a white oil having a gravity of approximately 28° A. P. I., and having a sufficiently high flash point to prevent complete volatilization during the heating, said white oil being present in a quantity that represents a small fraction of the said sulfuric acid, and recovering a reconcentrated acid.

2. The process defined by claim 1 in which the quantity of oil is about 0.001% to 1.0% by weight based on 100% sulfuric acid present.

3. The process defined by claim 1 in which the said acid treatment of hydrocarbon comprises the contact of olefinic hydrocarbons with sulfuric acid.

MACK C. FUQUA.

REFERENCES CITED

The following references are of record in the file of this patent:

UNITED STATES PATENTS

| Number | Name | Date |
| --- | --- | --- |
| 2,313,677 | Shinn | Mar. 9, 1943 |
| 2,400,340 | Cone | May 14, 1946 |
| 2,400,376 | Showalter | May 14, 1946 |
| 2,426,082 | Cone | Aug. 19, 1947 |
| 2,426,088 | Filbert | Aug. 19, 1947 |